US012246690B2

United States Patent
Cha et al.

(10) Patent No.: US 12,246,690 B2
(45) Date of Patent: Mar. 11, 2025

(54) APPARATUS FOR ESTIMATING BRAKE JUDDER OF VEHICLE AND METHOD THEREOF

(71) Applicants: HYUNDAI MOTOR COMPANY, Seoul (KR); Kia Corporation, Seoul (KR)

(72) Inventors: Ho Hyun Cha, Seoul (KR); Sung Wook Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 195 days.

(21) Appl. No.: 18/142,187

(22) Filed: May 2, 2023

(65) Prior Publication Data

US 2024/0217500 A1 Jul. 4, 2024

(30) Foreign Application Priority Data

Dec. 28, 2022 (KR) .................... 10-2022-0187503

(51) Int. Cl.
*B60T 17/22* (2006.01)

(52) U.S. Cl.
CPC ......... *B60T 17/221* (2013.01); *B60T 2230/04* (2013.01); *B60T 2240/06* (2013.01)

(58) Field of Classification Search
CPC ............... B60T 17/221; B60T 2230/04; B60T 2240/06; B60T 17/22; B60T 8/171; B60R 16/0232; G06N 20/00; B60Y 2306/15
See application file for complete search history.

(56) References Cited

U.S. PATENT DOCUMENTS

| | | | |
|---|---|---|---|
| 2019/0389443 A1* | 12/2019 | Foitzik | B60T 17/221 |
| 2021/0213927 A1* | 7/2021 | Kim | F16D 65/0006 |
| 2024/0116466 A1* | 4/2024 | Jung | B60R 16/0232 |
| 2024/0308484 A1* | 9/2024 | Travaglia | B60T 8/17557 |

* cited by examiner

Primary Examiner — Sizo B Vilakazi
(74) Attorney, Agent, or Firm — MORGAN, LEWIS & BOCKIUS LLP (57) ABSTRACT

An apparatus for estimating brake judder of a vehicle and a method thereof includes a communication device that receives sensor data from a plurality of vehicles, and a controller that extracts learning data by pre-processing the sensor data, trains a clustering model to group characteristic data corresponding to the learning data into a preset number of clusters, and estimates brake judder of a target vehicle based on the learned clustering model.

20 Claims, 6 Drawing Sheets

APPARATUS FOR ESTIMATING BRAKE JUDDER OF VEHICLE AND METHOD THEREOF

CROSS-REFERENCE TO RELATED APPLICATION

The present application claims priority to Korean Patent Application No. 10-2022-0187503, filed on Dec. 28, 2022, the entire contents of which is incorporated herein for all purposes by this reference.

BACKGROUND OF THE PRESENT DISCLOSURE

Field of the Present Disclosure

The present disclosure relates to a technique for estimating brake judder of a vehicle based on a machine learning model.

Description of Related Art

In general, a brake judder phenomenon of a vehicle refers to a phenomenon in which a dash panel and a steering wheel vibrate up and down, a steering wheel vibrates left and right, or a brake pedal vibrates back and forth when a driver of a vehicle depresses a brake pedal while driving.

Such a brake judder phenomenon is mainly caused by thermal deformation and thickness variation (DTV) of a brake disc. In detail, when the thermal deformation or thickness deviation of a brake disc occurs, a change occurs in the rotational frictional force between the brake disc and brake pad during braking. As a result, brake torque variation occurs, which causes brake pedal vibration, steering wheel vibration, vehicle body vibration, and the like.

Because such a brake judder phenomenon causes the replacement of brake discs in the maintenance process, it is important to accurately determine whether the vibration of the brake pedal, the vibration of the steering wheel, and the vibration of the vehicle body are actually caused by the brake judder phenomenon.

As a conventional technique for determining a brake judder phenomenon, there is a scheme of reproducing whether the judder phenomenon actually occurs by repeatedly braking under high-speed driving conditions, but this requires excessive A/S time and cost to check the judder phenomenon.

As another conventional technique for determining a brake judder phenomenon, there is a scheme of directly measuring a thickness deviation of a brake disc in micrometer units, but expensive measuring equipment is required and excessive measurement time is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and method for estimating brake judder of a vehicle configured for rapidly and accurately estimating brake judder of a vehicle by pre-processing various sensor data of the vehicle to extract learning data, training a clustering model to group characteristic data corresponding to the learning data into a preset number of clusters, and estimating the brake judder of the vehicle based on the clustering model.

Another aspect of the present disclosure provides an apparatus and method for estimating brake judder of a vehicle configured for determining a centroid of a cluster used for diagnosing brake judder, dividing the cluster into a plurality of reliability regions based on the distance from the centroid, and determining an estimation reliability (or severity) of the brake judder based on the plurality of reliability regions.

Yet another aspect of the present disclosure provides an apparatus and method for estimating brake judder of a vehicle configured for rapidly and accurately diagnosing brake judder of a vehicle by pre-processing various sensor data of the vehicle to extract learning data, training a clustering model to group characteristic data corresponding to the learning data into a preset number of clusters, and diagnosing the brake judder of the vehicle based on the clustering model.

Yet another aspect of the present disclosure provides an apparatus and method for estimating brake judder of a vehicle configured for determining a centroid of a cluster used for diagnosing brake judder, dividing the cluster into a plurality of reliability regions based on the distance from the centroid, and determining a diagnosis reliability (or severity) of the brake judder based on the plurality of reliability regions.

The technical problems to be solved by the present disclosure are not limited to the aforementioned problems, and any other technical problems not mentioned herein will be clearly understood from the following description by those skilled in the art to which the present disclosure pertains. Also, it may be easily understood that the objects and advantages of the present disclosure may be realized by the units and combinations thereof recited in the claims.

According to an aspect of the present disclosure, an apparatus for estimating brake judder of a vehicle includes a communication device that receives sensor data from a plurality of vehicles, and a controller that extracts learning data by pre-processing the sensor data, train a clustering model to group characteristic data corresponding to the learning data into a preset number of clusters, and estimates brake judder of a target vehicle based on the learned clustering model.

According to an exemplary embodiment of the present disclosure, the controller may be configured to determine a judder cluster from among the preset number of clusters and estimate that the brake judder occurs in the target vehicle when new characteristic data is included in the judder cluster.

According to an exemplary embodiment of the present disclosure, the controller may be configured to determine a centroid of the judder cluster, divide the judder cluster into a plurality of reliability regions based on a distance from the centroid, and determine an estimation reliability of the brake judder based on the plurality of reliability regions.

According to an exemplary embodiment of the present disclosure, the controller may obtain the distance from the centroid for each of new characteristic data, and determine an estimation reliability of the brake judder based on the reliability regions including an average value of each distance.

According to an exemplary embodiment of the present disclosure, the controller may be configured to determine the estimation reliability of the brake judder based on an area of a circle whose radius is a distance between the new characteristic data and a centroid and an area of each reliability region.

According to an exemplary embodiment of the present disclosure, the learning data may include at least one of a vehicle speed, a brake harshness, a braking time, a change amount in each wheel speed, a change value of each wheel speed, a steering wheel torque vibration, an amount of a brake hydraulic pressure pulsation vibration, and a judder diagnostic trouble code (DTC).

According to an exemplary embodiment of the present disclosure, the controller may be configured to determine the braking harshness based on a deceleration of the vehicle from a braking start point to a braking end point of the vehicle.

According to an exemplary embodiment of the present disclosure, the controller may be configured to determine the change value of the wheel speed based on a wheel speed of the vehicle and a speed of the vehicle.

According to an exemplary embodiment of the present disclosure, the controller may be configured to determine the steering wheel torque vibration based on a steering wheel torque value of the vehicle and an average of steering wheel torque values in a braking section of the vehicle.

According to an exemplary embodiment of the present disclosure, the controller may be configured to determine the amount of the brake hydraulic pressure pulsation vibration based on a brake hydraulic pressure value of the vehicle and an average of brake hydraulic pressure values in a braking section of the vehicle.

According to another aspect of the present disclosure, a method of estimating brake judder of a vehicle includes receiving, by a communication device, sensor data from a plurality of vehicles, extracting, by a controller, learning data by pre-processing the sensor data, learning, by the controller, a clustering model to group characteristic data corresponding to the learning data into a preset number of clusters, and estimating, by the controller, brake judder of a target vehicle based on the learned clustering model.

According to an exemplary embodiment of the present disclosure, the estimating of the brake judder may include determining a judder cluster from among the preset number of clusters, and estimating that the brake judder occurs in the target vehicle when new characteristic data is included in the judder cluster.

According to an exemplary embodiment of the present disclosure, the estimating of the brake judder may include determining a centroid of the judder cluster, dividing the judder cluster into a plurality of reliability regions based on a distance from the centroid, and determining an estimation reliability of the brake judder based on the plurality of reliability regions.

According to an exemplary embodiment of the present disclosure, the determining of the estimation reliability may include obtaining the distance from the centroid for each of a plurality of new characteristic data, and determining an estimation reliability of the brake judder based on the reliability regions including an average value of each distance.

According to an exemplary embodiment of the present disclosure, the determining of the estimation reliability may include determining the estimation reliability of the brake judder based on an area of a circle whose radius is a distance between the new characteristic data and a centroid and an area of each reliability region.

According to an exemplary embodiment of the present disclosure, the extracting of the learning data may include determining the braking harshness based on a deceleration of the vehicle from a braking start point to a braking end point of the vehicle.

According to an exemplary embodiment of the present disclosure, the extracting of the learning data may include determining the change value of the wheel speed based on a wheel speed of the vehicle and a speed of the vehicle.

According to an exemplary embodiment of the present disclosure, the extracting of the learning data may include determining the steering wheel torque vibration based on a steering wheel torque value of the vehicle and an average of steering wheel torque values in a braking section of the vehicle.

According to an exemplary embodiment of the present disclosure, the extracting of the learning data may include determining the amount of the brake hydraulic pressure pulsation vibration based on a brake hydraulic pressure value of the vehicle and an average of brake hydraulic pressure values in a braking section of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein include the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless so defined herein.

Figure 1:
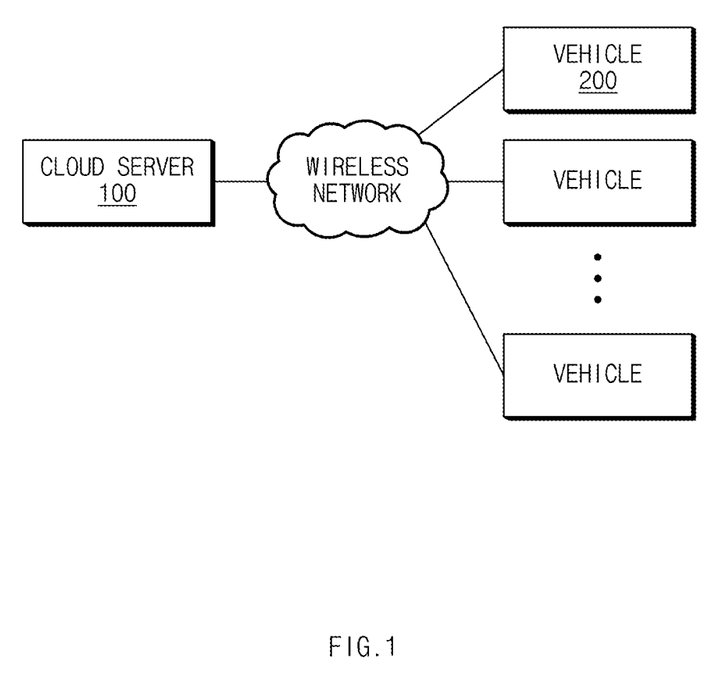
FIG. 1 is a block diagram illustrating a system for estimating brake judder of a vehicle according to an exemplary embodiment of the present disclosure.

FIG. 1 is a block diagram illustrating a system for estimating brake judder of a vehicle according to an exemplary embodiment of the present disclosure.

As shown in FIG. 1, a system for estimating brake judder of a vehicle according to an exemplary embodiment of the present disclosure may include a cloud server 100 and a plurality of vehicles 200.

Regarding each component, the cloud server 100 may receive various sensor data in communication with the plurality of vehicles 200, extract learning data by pre-processing the various sensor data, train a clustering model to group characteristic data corresponding to the learning data into the preset number of clusters, and estimate brake judder of a vehicle based on the clustering model. Furthermore, the cloud server 100 may be configured to determine a centroid of a cluster used for estimating brake judder, divide the cluster into a plurality of reliability regions based on the distance from the centroid, and determine an estimation reliability of the brake judder based on the plurality of reliability regions.

Furthermore, the cloud server 100 may receive various sensor data in communication with the plurality of vehicles 200, extract learning data by pre-processing the various sensor data, train a clustering model to group characteristic data corresponding to the learning data into the preset number of clusters, and diagnose brake judder of a vehicle based on the clustering model. Furthermore, the cloud server 100 may be configured to determine a centroid of a cluster used for diagnosing brake judder, divide the cluster into a plurality of reliability regions based on the distance from the centroid, and determine a diagnosis reliability of the brake judder based on the plurality of reliability regions.

The plurality of vehicles 200 may be connected to the cloud server 100 through a wireless network, and may transmit various sensor data to the cloud server 100. In the instant case, the various sensor data may include the speed of each wheel such as the speed of the front left wheel, the speed of the right front wheel, the speed of the left rear wheel, and the speed of the right rear wheel, a yaw, a gravitational acceleration, a brake master cylinder pressure, a wheel cylinder pressure, a motor driven power steering (MDPS) torque, a brake pedal sensor (BPS) value, an engine torque, a brake hydraulic pressure, and the like.

Figure 2:
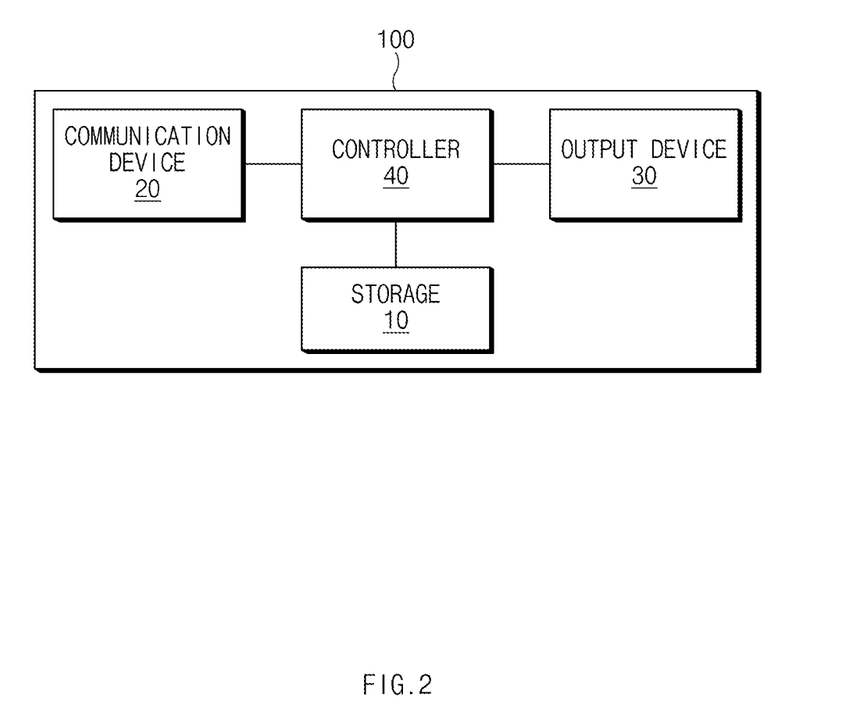
FIG. 2 is a block diagram illustrating an apparatus for estimating brake judder of a vehicle according to an exemplary embodiment of the present disclosure.

FIG. 2 is a block diagram illustrating an apparatus for estimating brake judder of a vehicle according to an exemplary embodiment of the present disclosure, which may be implemented, for example, in a form of the cloud server 100, but is not limited thereto.

As shown in FIG. 2, an apparatus for estimating brake judder of a vehicle according to an exemplary embodiment of the present disclosure may include storage 10, a communication device 20, an output device 30, and a controller 40. In the instant case, depending on a scheme of implementing an apparatus for estimating brake judder of a vehicle according to an exemplary embodiment of the present disclosure, components may be combined with each other to be implemented as one, or some components may be omitted.

Regarding each component, the storage 10 may store various logic, algorithms and programs required in the processes of receiving various sensor data in communication with the plurality of vehicles 200, extracting learning data by pre-processing the various sensor data, training a clustering model to group characteristic data corresponding to the learning data into the preset number of clusters, and estimating brake judder of a vehicle based on the clustering model.

The storage 10 may store various logic, algorithms and programs required in the processes of determining a centroid of a cluster used for estimating brake judder, dividing the cluster into a plurality of reliability regions based on the distance from the centroid, and determining an estimation reliability of the brake judder based on the plurality of reliability regions.

The storage 10 may store various logic, algorithms and programs required in the processes of receiving various sensor data in communication with the plurality of vehicles 200, extracting learning data by pre-processing the various sensor data, training a clustering model to group characteristic data corresponding to the learning data into the preset number of clusters, and diagnosing the brake judder of a vehicle based on the clustering model.

The storage 10 may store various logic, algorithms and programs required in the processes of determining the centroid of a cluster used for diagnosing brake judder, dividing the cluster into a plurality of reliability regions based on the distance from the centroid, and determining a diagnosis reliability of the brake judder based on the plurality of reliability regions.

The storage 10 may store a clustering model that represents a plurality of learning data as respective characteristic data and groups the plurality of characteristic data into the preset number of clusters. In the instant case, the clustering model may be a model for which learning has been completed through the preset number (e.g., 10,000) of learning data. Furthermore, the number of learning data corresponds to the number of braking of the vehicle.

The storage 10 may store a K-means clustering algorithm and an expectation-maximization algorithm used in a process of training a clustering model.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The communication device 20, which is a module providing a communication interface with each vehicle 200, may include at least one of a mobile communication module, a wireless Internet module, and a short-range communication module.

The mobile communication module may communicate with each electric vehicle 200 through a mobile communication network constructed according to a technical standard or communication scheme for mobile communication (e.g., Global System for Mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), High Speed Uplink Packet Access (HSUPA), Long Term Evolution (LTE), Long Term Evolution-Advanced (LTEA), and the like).

The wireless Internet module, which is a module for wireless Internet access, may communicate with each electric vehicle 200 through wireless LAN (WLAN), wireless-fidelity (Wi-Fi), Wi-Fi direct, Digital Living Network Alliance (DLNA), Wireless Broadband (WiBro), Worldwide Interoperability for Microwave Access (WiMAX), high speed downlink packet access (HSDPA), High Speed Uplink Packet Access (HSUPA), Long Term Evolution (LTE), Long Term Evolution-Advanced (LTE-A), and the like.

The short-range communication module may support short-range communication with each electric vehicle 200 by use of at least one of Bluetooth™, radio frequency identification (RFID), infrared data association (IrDA), ultra wideband (UWB), ZigBee, Near Field Communication (NFC), and wireless universal serial bus (USB) technology.

When the brake judder of the vehicle is estimated, the output device 30 may notify the user of it in a visual, auditory, or tactile manner.

The controller 40 may perform overall control so that each component performs its function. The controller 40 may be implemented in a form of hardware or software, or may be implemented in a combination of hardware and software. The controller 40 may be implemented as a microprocessor, but is not limited thereto.

The controller 40 may extract the learning data by preprocessing the various sensor data, train a clustering model to group characteristic data corresponding to the learning data into the preset number of clusters, and estimate brake judder of a vehicle based on the clustering model. In the instant case, the learning data may include a brake harshness, a braking time (braking section), a change amount in each wheel speed, a change value of each wheel speed, a steering wheel torque vibration, an amount of a brake hydraulic pressure pulsation vibration, and a judder diagnostic trouble code (DTC). In the instant case, the judder DTC may be arbitrarily added by the user. Additionally, the learning data may further include a weight of an empty vehicle, the center of gravity height (CGH), a tire radius, a vehicle speed, and the like.

The controller 40 may be configured to determine a braking harshness BH based on, for example, following Equation 1.

$$BH = \int_{t_{initial}}^{t_{final}} V dt \qquad \text{[Equation 1]}$$

where $t_{initial}$ represents a braking start time point, $t_{final}$ represents a braking end time point, and 'V' represents deceleration. In the instant case, the controller 40 may be configured to determine the average of the speeds of each wheel as the vehicle speed, and determine the deceleration based on the difference in vehicle speed for each time period.

For example, the controller 40 may be configured to determine the amount A of change in the wheel speed based on following Equation 2.

$$A = \int \sqrt{\left(\frac{dws}{dt}\right)^2} dt \qquad \text{[Equation 2]}$$

where ws represents a wheel speed.

For example, the controller 40 may be configured to determine a wheel speed variation value D based on following Equation 3.

$$D = \sum_{i=1}^{n} \sqrt{(ws - vs)^2} \qquad \text{[Equation 3]}$$

where ws represents a wheel speed and vs represents a vehicle speed.

For example, the controller 40 may be configured to determine a steering wheel torque vibration TV based on following Equation 4.

$$TV = \int \sqrt{(\text{MDPS\_Torque} - \mu_{MDPS\_Torque})^2} dt \qquad \text{[Equation 4]}$$

where MDPS_Torque represents a torque value of MDPS, and $\mu_{MDPS\_Torque}$ represents an average of MDPS torque values in a braking section of $(t_{initial}-t_{final})$.

For example, the controller 40 may be configured to determine the amount VA of brake hydraulic pressure pulsation vibration based on following Equation 5.

$$VA = \int \sqrt{(\text{Brake\_Pressure} - \mu_{Brake\_Pressure})^2} dt \qquad \text{[Equation 5]}$$

where Brake_Pressure represents a hydraulic pressure value of a brake, and $\mu_{Brake\_Pressure}$ represents an average of hydraulic pressure values of the brake in a braking section of $(t_{initial}-t_{final})$.

The controller 40 may be configured to determine a centroid of a cluster used for estimating brake judder, divide the cluster into a plurality of reliability regions based on the distance from the centroid, and determine an estimation reliability of the brake judder based on the plurality of reliability regions.

The controller 40 may extract learning data by preprocessing the various sensor data of the vehicle 200, train a clustering model to group feature data corresponding to the learning data into the preset number of clusters, and diagnose brake judder of a vehicle based on the clustering model.

The controller 40 may be configured to determine a centroid of a cluster used for diagnosing brake judder, divide the cluster into a plurality of reliability regions based on the distance from the centroid, and determine a diagnosis reliability of the brake judder based on the plurality of reliability regions.

Hereinafter, the operation of the controller 40 will be described in detail with reference to FIG. 3 and FIG. 4.

Figure 3:
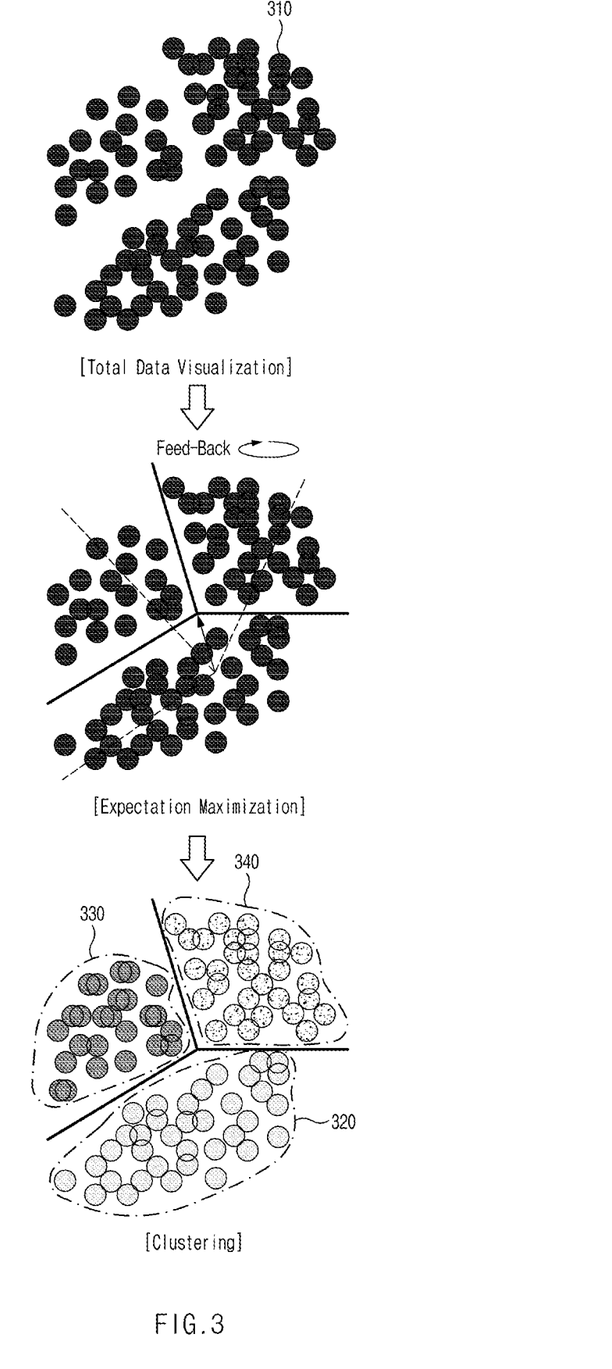
FIG. 3 is a diagram illustrating a process of clustering characteristic data corresponding to learning data by a controller provided in an apparatus for estimating brake judder of a vehicle according to an exemplary embodiment of the present disclosure.

FIG. 3 is a diagram illustrating a process of clustering characteristic data corresponding to learning data by a controller provided in an apparatus for estimating brake judder of a vehicle according to an exemplary embodiment of the present disclosure. FIG. 3 illustrates a clustering process based on a K-means clustering model.

As shown in FIG. 3, a clustering model may express the input learning data as characteristic data 310. In FIG. 3, [Total Data Visualization] represents an example of expressing a plurality of learning data as characteristic data, [Expectation Maximization] represents the result of performing feedback correction in the learning process, and [Clustering] represents the result of grouping a plurality of characteristic data into three clusters as an example.

The controller 40 may be configured to determine a probability that each cluster is a judder cluster based on whether a judder diagnostic trouble code (DTC) is included in the learning data, and may be configured to determine a cluster having the highest probability as a judder cluster.

In FIG. 3, reference numeral 320 may include a probability of being judder noise of 88%, a probability of being road noise of 9%, and a probability of non-noise of 3%, so that the controller 40 may is configured to determine reference numeral 320 as a judder cluster.

Reference numeral 330 may include a probability of non-noise of 85%, a probability of road surface noise of 8%, and a probability of judder noise of 7%, so that the controller 40 may be configured to determine reference numeral 330 as a non-noise cluster.

Reference numeral 340 may include a probability of road surface noise of 92%, a probability of non-noise of 5%, and a probability of judder noise of 3%, so that the controller 40 may be configured to determine reference numeral 340 as a road noise cluster.

Accordingly, when newly generated characteristic data is included in the judder cluster 320, the controller 40 may estimate or diagnose that judder has occurred.

Figure 4:
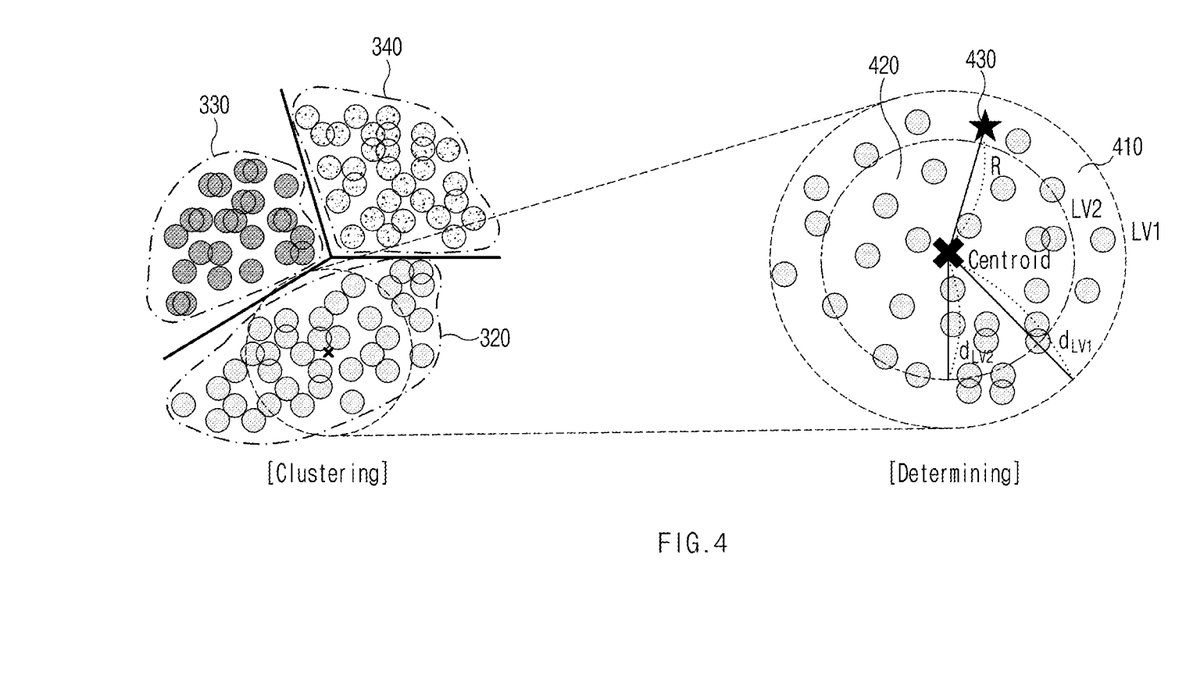
FIG. 4 is a diagram illustrating a process of determining reliability (or severity) of judder based on a judder cluster by a controller provided in an apparatus for estimating brake judder of a vehicle according to an exemplary embodiment of the present disclosure.

FIG. 4 is a diagram illustrating a process of determining reliability (or severity) of judder based on a judder cluster by a controller provided in an apparatus for estimating brake judder of a vehicle according to an exemplary embodiment of the present disclosure.

As shown in FIG. 4, the controller 40 may be configured to determine the centroid of the judder cluster 320, divide the judder cluster 320 into a plurality of reliability regions based on the distance from the centroid, and determine an estimation reliability of the brake judder based on the plurality of reliability regions.

In FIG. 4, $d_{Lv1}$ represents the distance from the centroid to Lv1, $d_{Lv2}$ represents the distance from the centroid to Lv2, reference numeral 410 represents a first reliability region, reference numeral 420 represents a second reliability region, and reference numeral 430 represents new characteristic data spaced apart by 'R' from the centroid. In the instant case, because the new characteristic data is included in the first reliability area, the controller 40 may be configured to determine the estimated reliability of the brake judder of the new characteristic data as the first reliability.

Meanwhile, the controller 40 may be configured to determine the estimation reliability of the brake judder by integrally processing a plurality of new characteristic data. That is, the controller 40 may obtain the distance from the centroid for the plurality of new characteristic data, and determine the estimation reliability of the brake judder of the new characteristic data based on the reliability region including an average value of each distance. For example, the controller 40 may obtain an average value $d_{new\_data}$ of each distance based on following Equation 6.

$$d_{new\_data} = \frac{\sum_{i=1}^{n} d_{data-centroid}}{n} \qquad \text{[Equation 6]}$$

where $d_{data-centroid}$ represents the distance between the characteristic data and the centroid.

The controller 40 may numerically determine the estimation reliability P for the brake judder based on following Equation 7.

$$P = \left(1 - \frac{S_{new} - S_1}{S_{total} - S_1}\right) \times 100 \qquad \text{[Equation 7]}$$

where $S_{total}$ represents the total area of the reliability region in the judder cluster, $S_1$ represents the area of the second reliability region 420, and $S_{new}$ represents the area of a circle whose radius is the distance between the new characteristic data and the centroid. For example, when $S_{total}$ is 100, $S_1$ is 60, and $S_{new}$ is 80, 'P' is 50%. As an exemplary embodiment of the present disclosure, when $S_{total}$ is 100, $S_1$ is 40, and $S_{new}$ is 60, 'P' is 67%.

Meanwhile, when the number of times of braking of the vehicle exceeds a threshold value (e.g., 10,000 times), the controller 40 may be configured to determine that it is necessary to update the software of electronic stability control (ESC), performing the update of the ESC or requesting the update to an electronic control unit (ECU) of the ESC.

Figure 5:
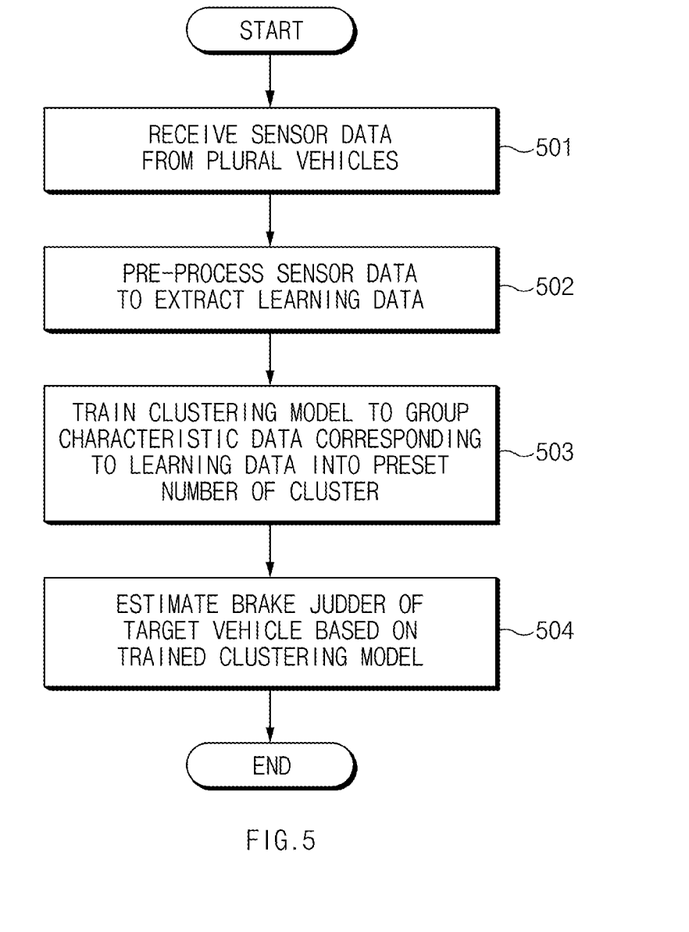
FIG. 5 is a flowchart illustrating a method of estimating brake judder of a vehicle according to an exemplary embodiment of the present disclosure.

FIG. 5 is a flowchart illustrating a method of estimating brake judder of a vehicle according to an exemplary embodiment of the present disclosure.

First, in 501, the communication device 20 receives sensor data from a plurality of vehicles.

Accordingly, in 502, the controller 40 pre-processes the sensor data to extract learning data.

Accordingly, in 503, the controller 40 learns a clustering model to group characteristic data corresponding to the learning data into the preset number of clusters.

Accordingly, in 504, the controller 40 estimates the brake judder of the target vehicle based on the learned clustering model. That is, the controller 40 may receive sensor data from the target vehicle, pre-process the sensor data to extract input data, output data corresponding to the input data based on the learned model FIG. 6 is a block diagram illustrating a determining system for executing a method of estimating brake judder of a vehicle according to an exemplary embodiment of the present disclosure.

Figure 6:
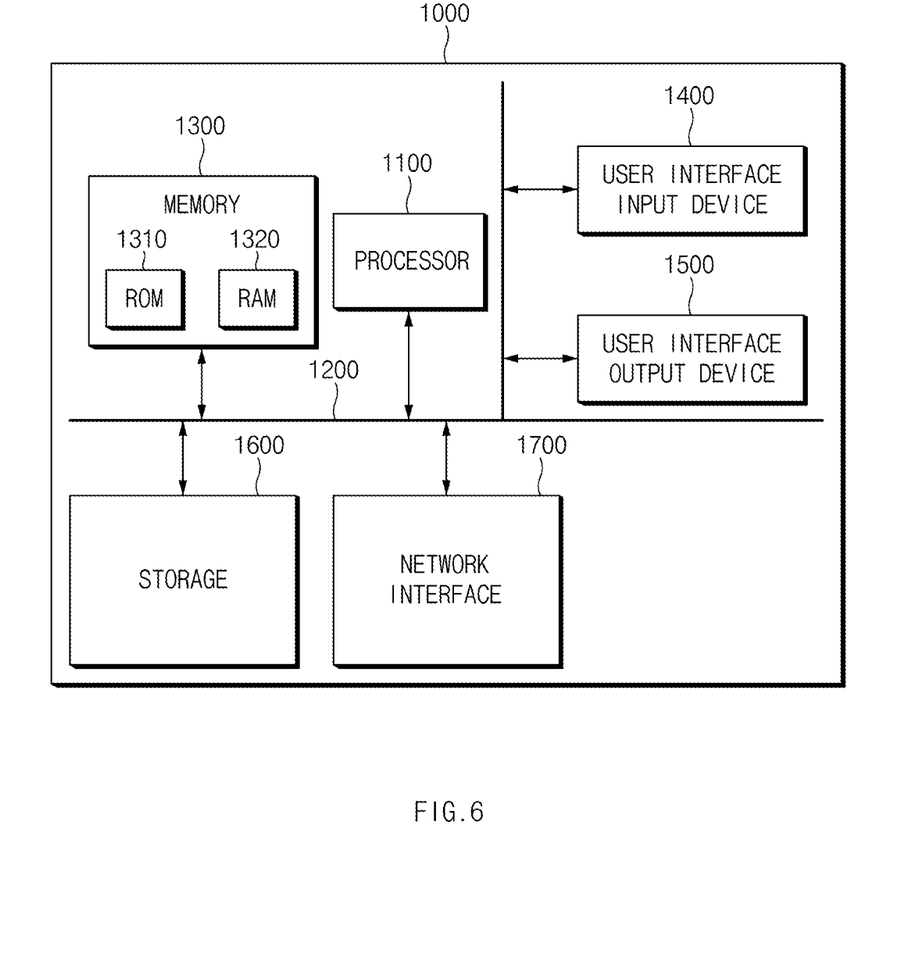
FIG. 6 is a block diagram illustrating a computing system for executing a method of estimating brake judder of a vehicle according to an exemplary embodiment of the present disclosure.

Referring to FIG. 6, as described above, a method of estimating brake judder of a vehicle according to an exemplary embodiment of the present disclosure may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) 1310 and a random access memory (RAM) 1320.

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor and the storage medium may reside in the user terminal as an individual component.

According to the exemplary embodiments of the present disclosure, it is possible to rapidly and accurately estimate brake judder of a vehicle by pre-processing various sensor data of the vehicle to extract learning data, training a clustering model to group characteristic data corresponding to the learning data into a preset number of clusters, and estimating the brake judder of the vehicle based on the clustering model.

Furthermore, according to the exemplary embodiments of the present disclosure, it is possible to rapidly and accurately diagnose brake judder of a vehicle by pre-processing various sensor data of the vehicle to extract learning data, training a clustering model to group characteristic data corresponding to the learning data into a preset number of clusters, and diagnosing the brake judder of the vehicle based on the clustering model.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for estimating brake judder of a vehicle, the apparatus comprising:
   a communication device configured to receive sensor data from a plurality of vehicles; and
   a controller electrically connected to the communication device and configured to extract learning data by pre-processing the sensor data, to train a clustering model to group characteristic data corresponding to the learning data into a preset number of clusters, and to estimate brake judder of a target vehicle based on the learned clustering model.

2. The apparatus of claim 1, wherein the controller is further configured to determine a judder cluster from among the preset number of clusters and to estimate that the brake judder occurs in the target vehicle when new characteristic data is included in the judder cluster.

3. The apparatus of claim 2, wherein the controller is further configured to determine a centroid of the judder cluster, to divide the judder cluster into a plurality of reliability regions based on a distance from the centroid, and to determine an estimation reliability of the brake judder based on the plurality of reliability regions.

4. The apparatus of claim 3, wherein the controller is further configured to obtain the distance from the centroid for each of a plurality of new characteristic data, and to determine an estimation reliability of the brake judder based on the reliability region including an average value of each distance.

5. The apparatus of claim 3, wherein the controller is further configured to determine the estimation reliability of the brake judder based on an area of a circle whose radius is a distance between the new characteristic data and the centroid and an area of each reliability region.

6. The apparatus of claim 1, wherein the learning data includes at least one of a vehicle speed, a brake harshness, a braking time, a change amount in each wheel speed, a change value of each wheel speed, a steering wheel torque vibration, an amount of a brake hydraulic pressure pulsation vibration, or a judder diagnostic trouble code (DTC) or any combination thereof.

7. The apparatus of claim 6, wherein the controller is further configured to determine the braking harshness based on a deceleration of each vehicle from a braking start point to a braking end point of each vehicle.

8. The apparatus of claim 6, wherein the controller is further configured to determine the change value of the wheel speed based on a wheel speed of each vehicle and a speed of each vehicle.

9. The apparatus of claim 6, wherein the controller is further configured to determine the steering wheel torque vibration based on a steering wheel torque value of each vehicle and an average of steering wheel torque values in a braking section of each vehicle.

10. The apparatus of claim 6, wherein the controller is further configured to determine the amount of the brake hydraulic pressure pulsation vibration based on a brake hydraulic pressure value of each vehicle and an average of brake hydraulic pressure values in a braking section of each vehicle.

11. A method of estimating brake judder of a vehicle, the method comprising:

receiving, by a communication device, sensor data from a plurality of vehicles;

extracting, by a controller electrically connected to the communication device, learning data by pre-processing the sensor data;

learning, by the controller, a clustering model to group characteristic data corresponding to the learning data into a preset number of clusters; and estimating, by the controller, brake judder of a target vehicle based on the learned clustering model.

12. The method of claim 11, wherein the estimating of the brake judder includes:

determining, by the controller, a judder cluster from among the preset number of clusters; and estimating, by the controller, that the brake judder occurs in the target vehicle when new characteristic data is included in the judder cluster.

13. The method of claim 12, wherein the estimating of the brake judder includes:

determining, by the controller, a centroid of the judder cluster;

dividing, by the controller, the judder cluster into a plurality of reliability regions based on a distance from the centroid; and determining, by the controller, an estimation reliability of the brake judder based on the plurality of reliability regions.

14. The method of claim 13, wherein the determining of the estimation reliability includes:

obtaining, by the controller, the distance from the centroid for each of a plurality of new characteristic data; and determining, by the controller, the estimation reliability of the brake judder based on the reliability region including an average value of each distance.

15. The method of claim 13, wherein the determining of the estimation reliability includes:

determining, by the controller, the estimation reliability of the brake judder based on an area of a circle whose radius is a distance between the new characteristic data and the centroid and an area of each reliability region.

16. The method of claim 11, wherein the learning data includes at least one of a vehicle speed, a brake harshness, a braking time, a change amount in each wheel speed, a change value of each wheel speed, a steering wheel torque vibration, an amount of a brake hydraulic pressure pulsation vibration, or a judder diagnostic trouble code (DTC) or any combination thereof.

17. The method of claim 16, wherein the extracting of the learning data includes:

determining, by the controller, the braking harshness based on a deceleration of each vehicle from a braking start point to a braking end point of each vehicle.

18. The method of claim 16, wherein the extracting of the learning data includes:

determining, by the controller, the change value of the wheel speed based on a wheel speed of each vehicle and a speed of each vehicle.

19. The method of claim 16, wherein the extracting of the learning data includes:

determining, by the controller, the steering wheel torque vibration based on a steering wheel torque value of each vehicle and an average of steering wheel torque values in a braking section of each vehicle.

20. The method of claim 16, wherein the extracting of the learning data includes:

determining, by the controller, the amount of the brake hydraulic pressure pulsation vibration based on a brake hydraulic pressure value of each vehicle and an average of brake hydraulic pressure values in a braking section of each vehicle.

* * * * *